United States Patent
Panthi et al.

(10) Patent No.: US 10,320,471 B1
(45) Date of Patent: Jun. 11, 2019

(54) DYNAMIC EFFECTIVE ISOTROPIC RADIATED POWER SPECTRAL DENSITY CONTROL

(71) Applicant: Panasonic Avionics Corporation, Lake Forest, CA (US)

(72) Inventors: Sunil Panthi, Lake Forest, CA (US); Christopher McLain, Lake Forest, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/019,433

(22) Filed: Jun. 26, 2018

(51) Int. Cl.
 *H04W 16/28* (2009.01)
 *H04B 7/185* (2006.01)

(52) U.S. Cl.
 CPC ..... *H04B 7/18543* (2013.01); *H04B 7/18508* (2013.01); *H04B 7/18513* (2013.01)

(58) Field of Classification Search
 CPC ............ H04B 7/18506; H04B 7/18508; H04B 7/18513; H04W 52/08; H04W 52/283
 USPC .... 455/12.1, 427, 13.1, 13.4, 522, 430, 509; 370/316; 343/879
 See application file for complete search history.

(56) References Cited

U.S. PATENT DOCUMENTS

| | | | |
|---|---|---|---|
| 6,181,990 B1 * | 1/2001 | Grabowsky | B64D 47/00 701/14 |
| 7,054,593 B2 | 5/2006 | De La Chapelle et al. | |
| 7,437,125 B2 | 10/2008 | McLain et al. | |
| 9,401,759 B2 * | 7/2016 | Noerpel | H04B 7/185 |
| 9,485,009 B1 * | 11/2016 | Shemesh | H04B 7/18508 |
| 9,647,748 B1 * | 5/2017 | Mitchell | H04B 7/1851 |
| 9,991,944 B2 * | 6/2018 | Noerpel | H04B 7/18506 |
| 2002/0058477 A1 * | 5/2002 | Chapelle | H04B 7/18506 455/13.4 |
| 2002/0058478 A1 * | 5/2002 | de La Chapelle | H04B 7/18506 455/13.4 |
| 2002/0168971 A1 * | 11/2002 | Parkman | H04B 7/18508 455/427 |
| 2003/0134595 A1 * | 7/2003 | DiCamillo | H04B 7/18513 455/13.4 |

(Continued)

OTHER PUBLICATIONS

Y. Yasuda, M. Ohashi, E Sugaya, M. Yasunaga, and Y. Karasawa; "Field Experiment on Digital Maritime and Aeronautical Satellite Communication Systems Using ETS-V"; 1989.

*Primary Examiner* — Tan H Trinh
(74) *Attorney, Agent, or Firm* — Brian Furrer

(57) ABSTRACT

An aeronautical satellite broadband communications system has an antenna defined by a transmit gain pattern varying according to an orientation relative to a geostationary orbit satellite. An antenna controller unit is connected to an aircraft inertial navigation system and receptive to navigation data therefrom, and a set of antenna orientation data is derived from the navigation data on a real-time basis. A broadband controller connected to the antenna controller unit generates a set of output variables as a function of normalized equivalent isotropic radiated power spectral density values of the antenna and the set of antenna orientation data. The set of output variables controls the output power and carrier bandwidth of transmissions from the antenna within predefined limits of equivalent isotropic radiated power spectral density that vary with values of the set of antenna orientation data.

20 Claims, 13 Drawing Sheets

(56) References Cited

U.S. PATENT DOCUMENTS

| | | | | |
|---|---|---|---|---|
| 2004/0147259 A1* | 7/2004 | Taylor | H04B 7/18508 | 455/430 |
| 2005/0143005 A1* | 6/2005 | Moore, III | H04B 7/18521 | 455/13.1 |
| 2005/0171653 A1* | 8/2005 | Taylor | H04B 7/18508 | 701/13 |
| 2007/0275659 A1* | 11/2007 | Parkman | H04B 7/18506 | 455/13.4 |
| 2011/0263199 A1* | 10/2011 | Cruz | H04B 7/18506 | 455/12.1 |
| 2012/0236784 A1* | 9/2012 | Lynch | H04B 7/18508 | 370/316 |
| 2014/0274180 A1* | 9/2014 | DuBois | H04W 72/04 | 455/509 |
| 2015/0380802 A1* | 12/2015 | Newkirk | H04B 7/18515 | 343/879 |
| 2016/0335309 A1* | 11/2016 | Ceccom | G08G 5/0013 | |
| 2017/0331176 A1* | 11/2017 | Levy | H01Q 1/28 | |
| 2018/0006371 A1* | 1/2018 | Dang | G01C 21/20 | |
| 2018/0145407 A1* | 5/2018 | Natsume | H01Q 3/08 | |
| 2018/0367212 A1* | 12/2018 | Reis | H04B 7/18513 | |
| 2019/0044611 A1* | 2/2019 | Treesh | H04B 7/18508 | |
| 2019/0103952 A1* | 4/2019 | Goudal | H04L 5/0064 | |

* cited by examiner

| OFF-AXIS ANGLE \ SKEW ANGLE | 0 | 10 | 20 | 30 | 40 | 50 | 60 | 70 | 80 | 90 |
|---|---|---|---|---|---|---|---|---|---|---|
| -5 | 13.7 | 14.4 | 14.3 | 6.6 | 11.1 | 14.0 | 6.5 | 16.6 | 7.8 | 15.7 |
| -4 | -5.3 | 2.8 | 11.6 | 15.4 | 12.5 | 8.7 | 18.7 | 10.9 | 21.2 | 25.9 |
| -3 | 9.7 | 7.6 | 12.0 | 11.7 | 18.7 | 20.2 | 11.5 | 21.6 | 29.5 | 31.5 |
| -2 | 21.3 | 21.2 | 20.5 | 18.2 | 7.7 | 17.6 | 26.8 | 31.5 | 34.0 | 34.8 |
| -1 | 29.2 | 29.5 | 30.3 | 31.4 | 32.7 | 33.9 | 35.1 | 36.0 | 36.5 | 36.7 |
| 0 | 37.4 | 37.4 | 37.4 | 37.4 | 37.4 | 37.4 | 37.4 | 37.4 | 37.4 | 37.4 |
| 1 | 29.2 | 29.5 | 30.3 | 31.5 | 32.8 | 34.1 | 35.3 | 36.2 | 36.7 | 36.9 |
| 2 | 21.3 | 21.2 | 20.6 | 18.2 | 7.4 | 18.1 | 27.2 | 31.9 | 34.4 | 35.3 |
| 3 | 9.7 | 7.6 | 11.6 | 11.8 | 18.8 | 20.4 | 11.5 | 22.1 | 29.9 | 32.0 |
| 4 | -5.3 | 2.5 | 11.4 | 15.4 | 12.7 | 8.3 | 18.8 | 11.2 | 21.2 | 26.1 |
| 5 | 13.7 | 14.3 | 14.2 | 6.6 | 10.9 | 14.0 | 5.0 | 16.6 | 3.9 | 10.8 |

FIG. 5

| SKEW ANGLE | ELEVATION ANGLE | | | | | |
|---|---|---|---|---|---|---|
| | 25 | 26 | 27 | 28 | 29 | 30 |
| 65 | -8.089 | -8.020 | -7.952 | -7.883 | -7.815 | -7.747 |
| 66 | -8.429 | -8.357 | -8.284 | -8.212 | -8.139 | -8.067 |
| 67 | -8.770 | -8.693 | -8.616 | -8.540 | -8.463 | -8.386 |
| 68 | -9.110 | -9.029 | -8.949 | -8.868 | -8.787 | -8.706 |
| 69 | -9.451 | -9.366 | -9.281 | -9.196 | -9.111 | -9.026 |
| 70 | -9.792 | -9.702 | -9.613 | -9.524 | -9.435 | -9.346 |
| 71 | -10.176 | -10.078 | -9.980 | -9.881 | -9.783 | -9.685 |
| 72 | -10.561 | -10.454 | -10.346 | -10.239 | -10.132 | -10.024 |
| 73 | -10.946 | -10.829 | -10.713 | -10.596 | -10.480 | -10.364 |
| 74 | -11.330 | -11.205 | -11.079 | -10.954 | -10.828 | -10.703 |
| 75 | -11.715 | -11.580 | -11.446 | -11.311 | -11.177 | -11.042 |
| 76 | -12.126 | -11.979 | -11.831 | -11.684 | -11.536 | -11.389 |
| 77 | -12.537 | -12.377 | -12.216 | -12.056 | -11.895 | -11.735 |
| 78 | -12.948 | -12.775 | -12.602 | -12.428 | -12.255 | -12.081 |
| 79 | -13.360 | -13.173 | -12.987 | -12.800 | -12.614 | -12.427 |

FIG. 7

DYNAMIC EFFECTIVE ISOTROPIC RADIATED POWER SPECTRAL DENSITY CONTROL

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to satellite communication systems installed onboard aircraft, and more particularly, to dynamic effective isotropic radiated power (EIRP) spectral density control in an adaptive single channel per carrier (A-SCPC) link for use in aeronautical satellite broadband communications (ASBC).

2. Related Art

With terrestrial data connectivity being almost ubiquitous because of the widespread deployment of broadband access modalities, customer demand for the same level of access across additional environments, including commercial aviation, is increasing. In addition to delivering various media content to passengers via seat-back display units and personal electronic devices, in-flight entertainment and communications (IFEC) systems also incorporate satellite communication capabilities that allow continuous access to e-mail, instant messaging, banking services, file sharing, and countless other productivity applications that rely on Internet service. Such satellite-based broadband Internet access, as deployed in an aircraft environment, may be generally referred to as Aeronautical Satellite Broadband Communications (ASBC).

Personal electronic devices typically connect to an IFEC system via a local area wireless network implemented with, for example, WiFi access points located throughout the cabin. The IFEC system also includes or cooperates with a satellite link terminal that is in communication with a geosynchronous orbit (GSO) satellite, which in turn is in communication with a ground station that is connected to the Internet. There may be up to a dozen satellites in the network spaced around the Earth. The seatback terminal display devices may also be connected to the satellite link terminal via a wired local network connection. Onboard data traffic is thus routed through the wired and/or wireless aircraft network, to the satellite link module, to the satellite, and then to the ground station. Preferably, continuous global coverage and uniform service throughout flights is provided over varying operating conditions.

The satellite link terminal is generally comprised of an antenna, a broadband controller, and a modem, together which establish an Adaptive Single Channel Per Carrier (A-SCPC) link to the satellite. The aircraft-mounted antenna may be a low-profile electronically steered type, high-profile, mechanically-steered type, or a very small diameter parabolic type. The radiation characteristics change based on the target satellite, the location of the aircraft relative to the satellite, and the three-axis orientation of the aircraft.

Most ASBC providers utilize either the low-profile, electrically steered antenna or the high-profile, mechanically steered antenna. Low-profile, electrically steered antennas have radiation patterns, beam widths, and gains that vary with scan angle, skew angle, and azimuthal angle towards the satellite. High-profile, mechanically steered antennas, on the other hand, produce uniform gain, but the gain pattern and the beam width projected toward the satellite vary with skew angle. A very small diameter parabolic antenna has a large beam width, but the gain pattern does not change as a function of elevation, skew angle, and azimuthal angle toward the satellite.

With a high-profile, mechanically steered antenna that is mounted to the aircraft, the beam width projected toward the satellite is understood to increase as the skew angle, i.e., the angular offset between the antenna beam axis and the satellite, increases from 0° to 90°. With the increase in beam width, which is elliptical in shape along three dimensions, the greater the possibility of the transmissions to interfere with an adjacent satellite in geostationary orbit. Accordingly, the prevention of such interference in the operation of ASBC is desirable.

There are strict regulatory restrictions in place both domestically in the United States of America as well as internationally for providers of satellite broadband communications, particularly for aeronautical operations. The United States Federal Communications Commission, for example, requires all Earth Station Aboard Aircraft (ESAA) operators to comply with 47 C.F.R. § 25.227 when transmitting to a geostationary orbit satellite, that is, operating with a geostationary orbit fixed satellite service (FSS). In further detail, subsection (a)(1)(i)(A) of § 25.227 specifies Equivalent Isotropically Radiated Power (EIRP) spectral density (ESD) limits for emissions in the plane tangent to the geostationary orbit arc of a satellites. For an off-axis angle $\theta$ of between 1.5° and 7°, the maximum EIRP is $-21-25 \log_{10} \theta$ dBW/Hz, for an off-axis angle $\theta$ between 7° and 9.2°, the maximum EIRP is $-42$ dBW/Hz, for an off-axis angle $\theta$ between 9.2° and 19.1°, the maximum EIRP is $-18-25 \log_{10} \theta$ dBW/Hz, and for an off-axis angle $\theta$ between 19.1° and 180°, the maximum EIRP is $-50$ dBW/Hz. The International Telecommunications Union imposes similar, but less stringent EIRP limits on earth station fixed satellite service (FSS) operators. Many countries worldwide adopt either the ITU or U.S. FCC requirements for operators within their jurisdiction. Satellite operators themselves also enter into coordination agreements between themselves on ESD limits to prevent mutual interference and impose these requirements on ASBC through contractual lease requirements. Operating frequency band, overlapping coverage of the satellite beam, and the negotiation between the satellite operators may further change such limits. However, because ASBC service are utilized worldwide, compliance requirements may vary significantly.

In order to comply with the foregoing EIRP restrictions such that the spectral density falls below permissible limits, the operation of the satellite terminal may be variously adjusted. The manipulable parameters include the transmitted EIRP, the channel/carrier bandwidth, and the elevation, azimuth and skew angle of operation. With ASBC-equipped aircraft have global reach, the varying EIRP spectral density restrictions make operations difficult, even while the cost and efficiency penalties for maintaining such compliant operations is high. Conventionally, compliance is ensured by first defining a desired service area per satellite beam. Then, limits are set on where the aircraft can operate within the beam. These limits ensure that the no transmissions take place outside of the service area. The aircraft roll and pitch limits within a service area is then determined, and the maximum skew angle for a given coverage region and aircraft roll/pitch is calculated. A maximum skew angle limit is set that cannot be exceeded during operation. The EIRP of the antenna and/or the modem input levels for the maximum skew angle condition is calculated, and a carrier bandwidth consistent with such EIRP is created. The satellite terminal is operated with a fixed carrier bandwidth and the calculated EIRP limit, and the optimum data rate for the carrier bandwidth is delivered.

This approach is understood to ensure compliance by controlling the EIRP spectral density to the permissible limit and applying a power limit mask to reduce transmission power. However, there are substantial penalties because the terminal operating conditions are set for the worst case, e.g., the highest skew location within a limited service area. For a fixed service such as a very small aperture terminal (VSAT), this is an acceptable approach. For mobile operations as with ESAA, there is a large service area within which compliance to varying regulatory limits must be maintained at all times. The conventional approach assumes the worst operating coverage and the worst aircraft roll/pitch for a particular satellite, even while operating under more ideal conditions.

Different flight positions for a given satellite coverage strength may require different carrier bandwidth, and operate with different spectral efficiency. A typical satellite capacity cost is $2500/MHz per month, and the higher the spectral efficiency, the lower the cost to deliver a given data rate. Generally, skew is minimized when the antenna/aircraft is directly north or south of the satellite. In one exemplary ESAA service, the satellite may have a geostationary orbit almost directly south of New York, USA. (Exemplary as used throughout this disclosure means as an example, and not necessarily the best or optimal implementation/embodiment). Satellite connectivity service for an aircraft operating near New York may thus cost $1,717 per Mbps per month, as the spectral efficiency is higher. Continuing with this example, for an aircraft operating near Los Angeles International Airport, satellite service may cost $4,166 per Mbps per month because of the lower spectral efficiency. Yet, with the conventional approach to EIRP spectral density compliance, because the worst operating conditions are assumed (e.g., the configuration for the flight operating near Los Angeles), the same cost per Mbps per month is understood to apply to the aircraft operating in different locations.

Accordingly, there is a need in the art for aeronautical satellite broadband communication systems in which waste of satellite bandwidth is reduced while remaining compliant with EIRP spectral density regulator limits to avoid interference with adjacent satellites. There is also a need for such satellite broadband communications systems to maintain regulatory compliance while delivering a consistent level of service despite aircraft position and orientation relative to the satellite. As a result, there is a need for dynamic EIRP spectral density control in an adaptive single channel per carrier link for use in aeronautical satellite broadband communications system.

BRIEF SUMMARY

Disclosed is an aeronautical satellite broadband communications system with dynamic equivalent isotropic radiated power spectral density control in an adaptive single channel per carrier link. The system is contemplated to maximize satellite coverage to its full potential based on location of the aircraft and the orientation of the onboard antenna to the satellite. Furthermore, the data rate that may be delivered is fully adaptive and has not fixed or static limit, and a communications remain operational even when the aircraft exceeds skew limit during roll and pitch maneuvers. Substantial cost savings associated with satellite services may also be realized over conventional techniques.

According to one embodiment, an aeronautical satellite broadband communications system may include an antenna defined by a transmit gain pattern varying according to an orientation relative to a geostationary orbit satellite. There may also be an antenna controller unit that is connected to an aircraft inertial navigation system and receptive to navigation data therefrom. A set of antenna orientation data may be derived from the navigation data on a real-time basis. The system may also include a broadband controller that is connected to the antenna controller unit. The broadband controller may also be generating a set of output variables as a function of normalized equivalent isotropic radiated power spectral density values of the antenna derived from the transmit gain pattern and the set of antenna orientation data. The set of output variables may control output power and carrier bandwidth of transmissions from the antenna within predefined limits of equivalent isotropic radiated power spectral density that vary with values of the set of antenna orientation data. The system may further include a satellite modem connected to the antenna and to the broadband controller. The output power and carrier bandwidth of the satellite modem to the antenna may be set based upon the output variables from the broadband controller.

Another embodiment of the present disclosure is a method for controlling equivalent isotropic radiated power spectral density of a communications link between an aircraft and a geosynchronous orbit satellite. The method may include a step of retrieving navigation data from an avionics bus of the aircraft, as well as a step of selecting a satellite beam from a plurality of available satellite beams for establishing the communications link to the geosynchronous orbit satellite. Each of the satellite beams may be associated with a regulatory compliance mask. There may also be a step of retrieving antenna orientation data from an antenna controller unit. The antenna orientation data may be derived from the navigation data, and further may be representative of an orientation of the antenna relative to the geosynchronous orbit satellite. The method may further include generating, on a broadband controller, a set of output variables as a function of the antenna orientation data, a set of normalized equivalent isotropic radiated power spectral density values for an antenna mounted to the aircraft, and the regulatory compliance mask. The method may also include relaying the output variables to a modem. An output power and a carrier bandwidth of the satellite beam transmitted from the antenna may be controllable by the output variables for transmissions to be within predefined limits of equivalent isotropic radiated power spectral density.

There is also an embodiment in which the foregoing steps of the method are implemented as a series of computer or machine-readable instructions that are executed by a data processor. The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a table showing an exemplary sample of antenna gain values as a function of skew angle;

FIG. 7 is table of exemplary normalized ESD values arranged according to elevation angle and skew angle;

DETAILED DESCRIPTION

The detailed description set forth below in connection with the appended drawings is intended as a description of the several presently contemplated embodiments of dynamic equivalent isotropic radiated power (EIRP) spectral density control in an adaptive single channel per carrier (A-SCPC) link. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
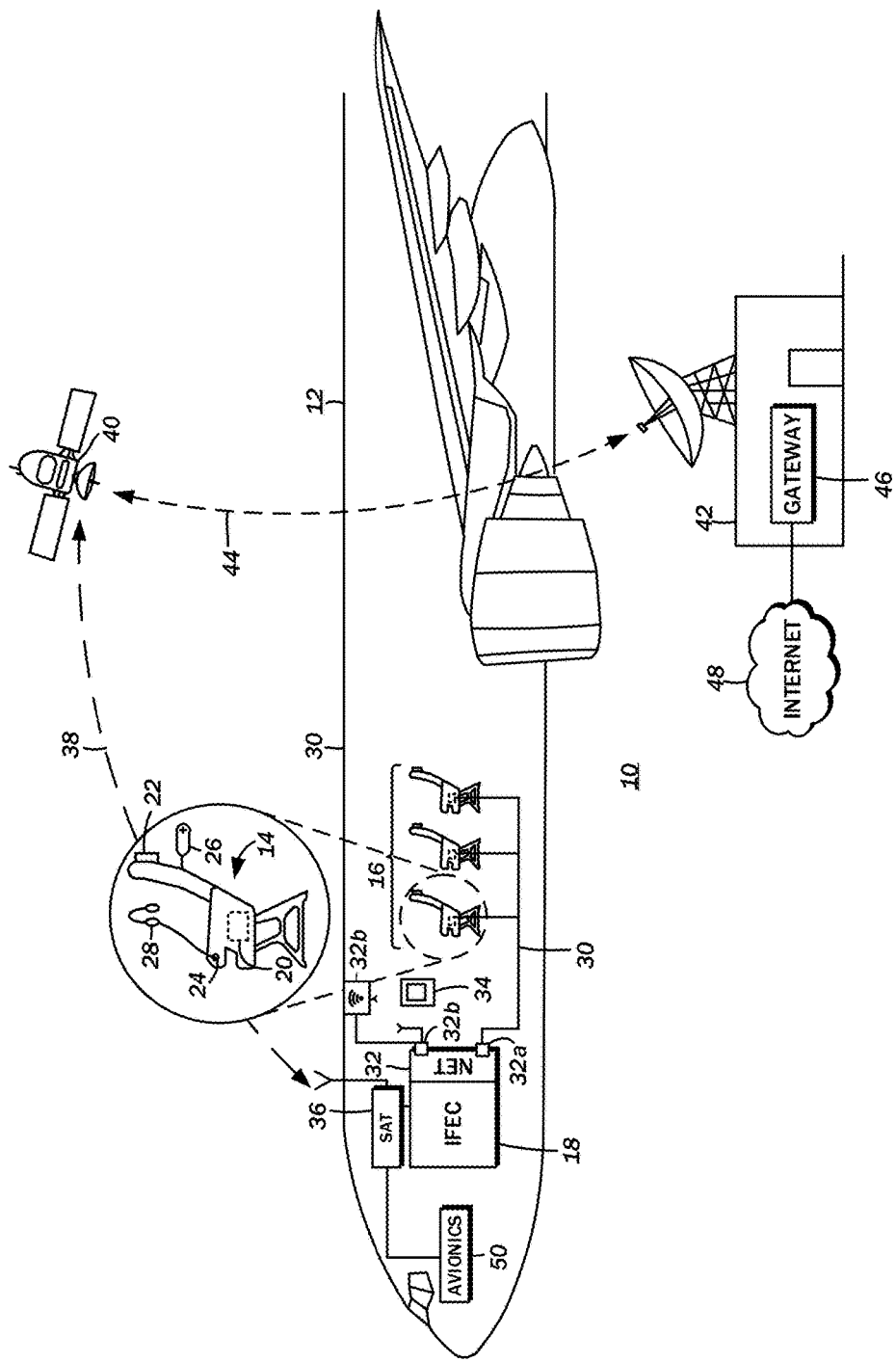
FIG. 1 is a diagram illustrating an aircraft environment in which the presently disclosed systems and methods for dynamic equivalent isotropic radiated power (EIRP) spectral density control may be utilized.

FIG. 1 is a simplified diagram of an aircraft 10, generally referred to herein as a vehicle, along with select subsystems and components thereof that represent an exemplary environment in which an aeronautical satellite broadband communications (ASBC) may be implemented. Within a fuselage 12 of the aircraft 10, there may be seats 14 arranged over multiple rows 16, with each seat 14 accommodating a single passenger.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen or other type with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including two or three sockets or a standard audio output without noise canceling. In alternate embodiments, each display 22 may incorporate a terminal unit 20 to form a display unit referred to in the art as a smart monitor.

A common use for the terminal unit 20 installed on the aircraft 10 is the playback of various multimedia content. The terminal unit 20 may be implemented with a general-purpose data processor that decodes the data files corresponding to the multimedia content and generates video and audio signals for the display 22 and the audio output 24, respectively. The multimedia content data files may be stored in one or more repositories associated with the IFEC system 18, and each of the terminal units 20 for each seat 14 may be connected thereto over a local area network 30, one segment of which may preferably be Ethernet. The IFEC system 18 thus includes a data communications module 32, and more specifically, an Ethernet data communications module 32a, e.g., an Ethernet switch or router.

One or more passengers may utilize a portable electronic device (PED) 34 during flight. For purposes of the present disclosure, PEDs 34 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Almost all conventional PEDs 34 have a WLAN (WiFi) module, so the data communications module 32 of the IFEC system 18 includes a WLAN access point 32b. The PED 34, via the onboard WLAN network, may connect to the IFEC system 18 to access various services offered thereon such as content downloading/viewing, shopping, and so forth. The local area network interface or data communications module 32 is understood to encompass the hardware components such as the WLAN access point 32b and the Ethernet router/switch 32a, as well as the software drivers that interface the hardware components to the other software modules of the IFEC system 18.

The IFEC system 18 may also offer Internet access to the connecting terminal units 20 as well as the PEDs 34. One contemplated modality that operates with the IFEC system 18 is a satellite terminal 36 that establishes an uplink 38 to a communications satellite 40. The data transmitted to the communications satellite 40 is relayed to a satellite communications service provider 42. A downlink 44 is established between the communications satellite 40 and the satellite communications service provider 42 that, in turn, includes a network gateway 46 with possibly a connection to the Internet 48 or other wide area network.

The terminal unit 20 or the PED 34 is understood to connect to the IFEC system 18 via the local area network 30 established by the data communications module 32, which relays the data transmissions to the satellite terminal 36. The data is transmitted to the communications satellite 40 over the uplink 38, and the communications satellite 40 relays the data to the satellite communications service provider 42 over the downlink 44. The network gateway 46 then routes the transmission to the Internet 48.

The aircraft 10 is comprised of multiple independent systems, and the IFEC system 18 discussed above is one such independent system. Separate from the IFEC system 18 is the avionics system 50, which is understood to encompass the electronics system for the flight controls and the inertial navigation system of the aircraft 10, along with communications with air traffic control and airline operations, ground-based and satellite-based navigation systems, flight management/monitoring systems, collision avoidance systems, flight recorders, and weather systems. The present disclosure contemplates the dynamic control of satellite uplink transmission parameters based upon aircraft navigational data to provide global coverage while maintaining compliance with various equivalent isotropic radiation power spectral density limits over multiple jurisdictions/locales and varying aircraft orientations (along three axes) during flight.

As is known in the art, aeronautical satellite broadband communications (ABSC) is implemented with a network of dozens of communications satellites 40 in geostationary orbit at various locations around the earth. Each of the communications satellites 40 are understood to have different spacing to adjacent satellites, and the disclosed system is contemplated to avoid interference therewith despite varying signal stretch and beam overlap.

One exemplary implementation of the satellite network utilizes a time division multiple access (TDMA) channel sharing modality/inbound multiple access. As will be understood by those in the art, TDMA allocates different timeslots for each node in the network, with a given node transmitting only during its dedicated timeslot. Carrier bandwidth is targeted for a specific data rate, and to the extent a higher data rate is requested, additional time slots are dedicated to that node for a fixed carrier bandwidth. With TDMA systems, carrier bandwidth is understood to be larger because resource sharing is in the time domain, and with a larger carrier bandwidth, reduction in EIRP spectral density, abbreviated herein to ESD, is possible.

In further detail, and as briefly noted above, the satellite terminal 36 includes a modem that implements single channel per carrier (SCPC). Each aircraft has a dedicated carrier, and the bandwidth can change based on aircraft demand. The size of the carrier is generally smaller than for conventional TDMA modalities, which may result in an increased ESD. Maintaining regulatory compliance with conventional TDMA is based upon a fixed bandwidth, but because of the time-varying bandwidth of the SCPC satellite communications network, various alternatives for ensuring compliance is contemplated in accordance with the present disclosure.

Figure 2:
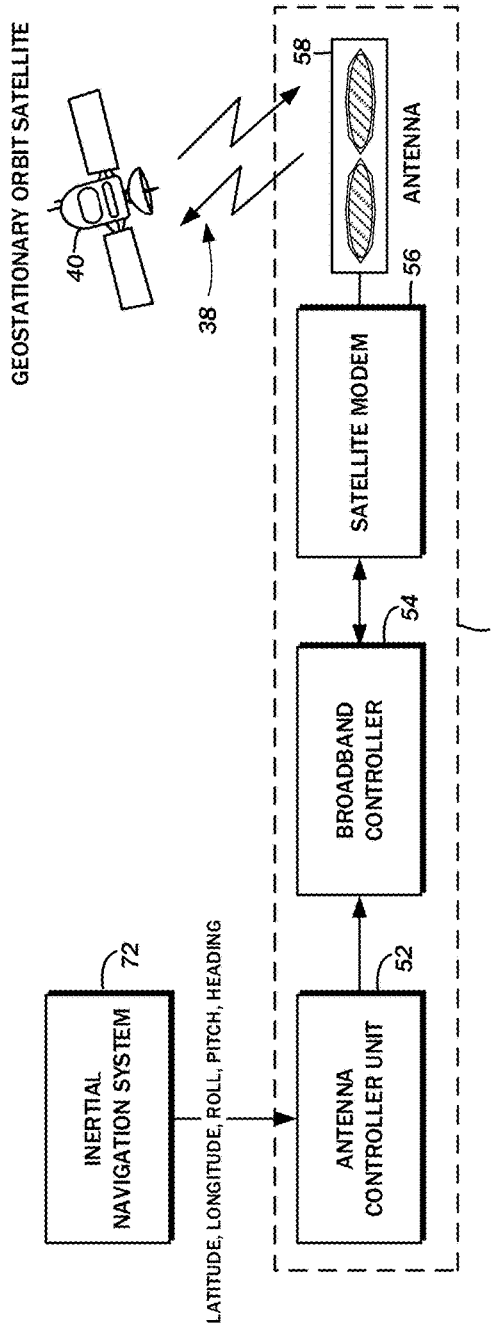
FIG. 2 is a block diagram of an exemplary satellite communications module for implementing the dynamic equivalent isotropic radiated power spectral density control.

Referring now to the block diagram of FIG. 2, the satellite terminal 36 is generally comprised of an antenna controller unit 52, a broadband controller 54, a satellite modem 56, and an antenna 58 that is mounted to the aircraft 10. Those having ordinary skill in the art will recognize that the satellite terminal 36 and its functional subparts can be arranged and organized in any number of different configurations. Furthermore, there may be additional components not mentioned herein performing various functions that are described only in general terms. For example, the satellite modem 56 is also connected to the local area network 30 of the aircraft, and passes the data traffic originating therefrom or destined thereto via a gateway or other device, but such devices and connections are not shown, nor described in additional detail. Certain described functions may be handled by a different subpart or component than that to which the present disclosure attributes.

The present disclosure contemplates the dynamic control of equivalent isotropic radiated power (EIRP) spectral density (ESD) by controlling satellite uplink parameters in real-time based on the operation of the aircraft, specifically the location of the aircraft 10, the location of the communications satellite 40, the current maneuvers of the aircraft 10, and the performance characteristics of the antenna 58. The satellite terminal 36 is configured to optimize the bandwidth used to deliver the demanded data rate at any given location, while remaining within regulatory ESD limits for such location.

Figure 3:
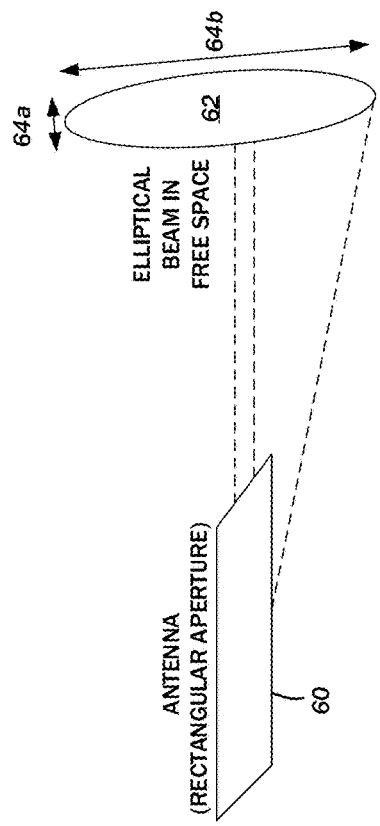
FIG. 3 illustrates an example high profile aeronautical antenna beam shape.
Figure 4:
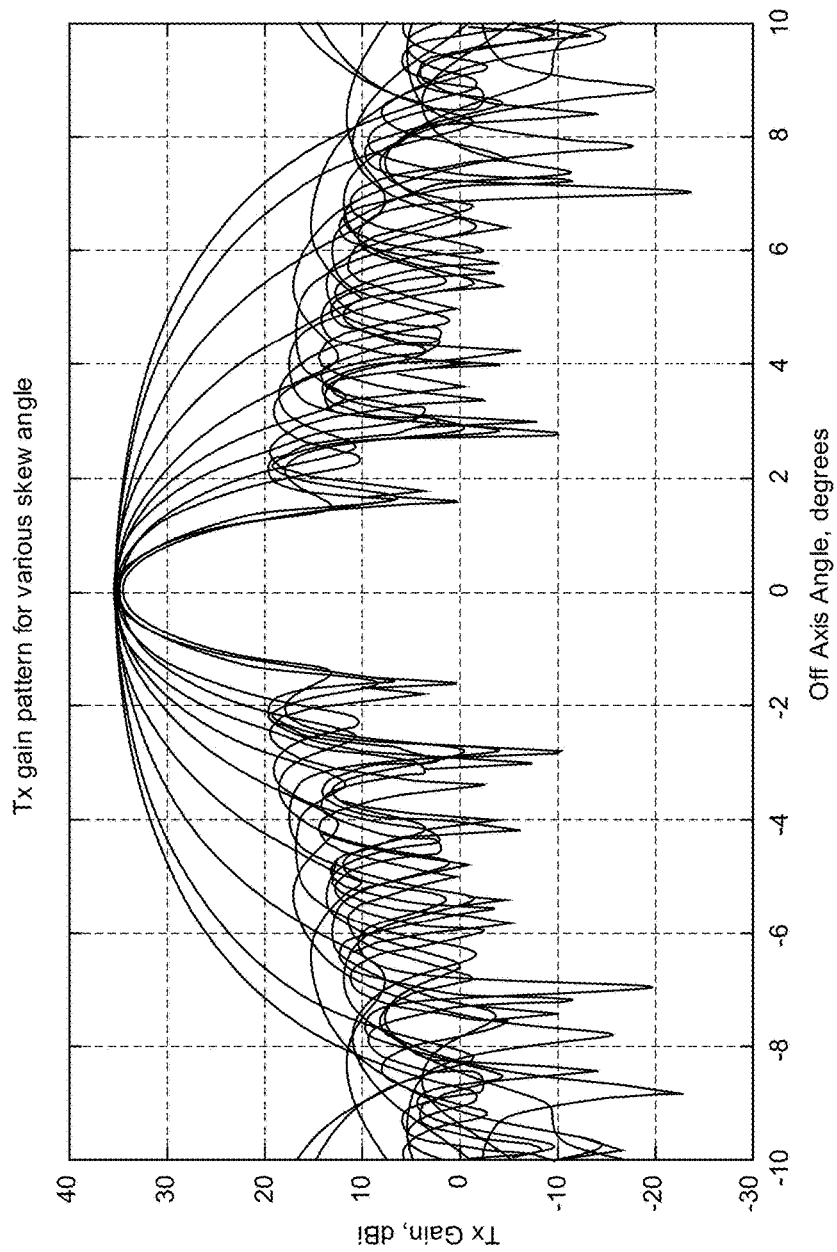
FIG. 4 is a graph showing plotting the gain pattern of an antenna for different skew angles relative to a satellite.

The ESD of a given RF (radiofrequency) transducer, that is, the antenna 58, is in large measure dependent upon the performance parameters thereof. Referring to FIG. 3, a typical high profile aeronautical antenna is characterized by a rectangular aperture 60. RF signal transmissions from this antenna may be defined in terms of a beam, and is depicted as an elliptical cross section 62. This elliptical beam, in turn, is defined by an azimuth beamwidth 64a, and an elevation beamwidth 64b. Generally, the antenna 58 is defined by a transmit gain or radiation pattern that varies according to is orientation relative to the communications satellite 40. The graph of FIG. 4 illustrates the variations in antenna gain pattern, given in dBi, over different off-axis angles and skew angle but with a fixed elevation angle.

According to one embodiment, the transmit radiation pattern may be measured in an anechoic chamber and tabulated as shown in the example table of FIG. 5. The gain value for a particular intersect of the off-axis angle between −5° and +5°, and the skew angle between 0° and 90° is provided. That is, each row corresponds to a particular skew angle, and each column corresponds to a particular off-axis angle. The range of elevation angle can span between 0° and 90°, the range of skew angle can likewise span between 0° and 90°, and the range of azimuthal angle can span between 0° and 360°. The off-axis angle may be between −180° and +180°. A three-dimensional, full hemispherical pattern at various geometrical conditions is thus derived.

Depending on the type of the antenna 58, the radiation pattern is understood to be different for varying skew angles, elevation angles, and azimuthal angles. The skew angle, elevation angle, and azimuthal angle may be more generally referred to as an orientation of the antenna 58 relative to the communications satellite 40. Although the exemplary embodiment described herein utilizes an antenna 58 with simultaneously varying skew angle and elevation angle, it will be appreciated that other antennas in which only the skew angle varies, only the elevation angle varies, or all three of the skew angle, elevation angle, and azimuthal angle varies are also possible. In such embodiments, suitable modifications to the measured data and the organization thereof are deemed to be within the purview of those skilled in the art.

The aforementioned antenna transmit gain data is used to derive corresponding equivalent isotropic radiated power density values, as regulatory compliance for earth station aboard aircraft satellite transmissions is based on ESD rather than antenna gain. The ESD for a given off-axis angle is given by:

$$TxGain + AmpPower - 10\log_{10}\left(\frac{Bandwidth}{RollOffFactor}\right).$$

As referenced herein, TxGain is the specific gain value for a given off-axis angle, AmpPower is the output power of the amplifier to which the antenna 58 is connected, and Bandwidth is the carrier bandwidth of the uplink 38. It is understood that ESD is a function of amplifier power and bandwidth, and so one embodiment of the present disclosure contemplates the adjustment of ESD by controlling the amplifier power and the transmission signal bandwidth. For a given skew angle and elevation angle, the reduction of the amplifier power and/or increase in the bandwidth is understood to result in the concomitant reduction of ESD to be below regulatory compliance limits. However, to the extent the cost penalty for output power and bandwidth reductions is too high, it is also possible to limit skew angle and/or the elevation angle for which the satellite terminal 36 is permitted to operate.

Figure 6A:
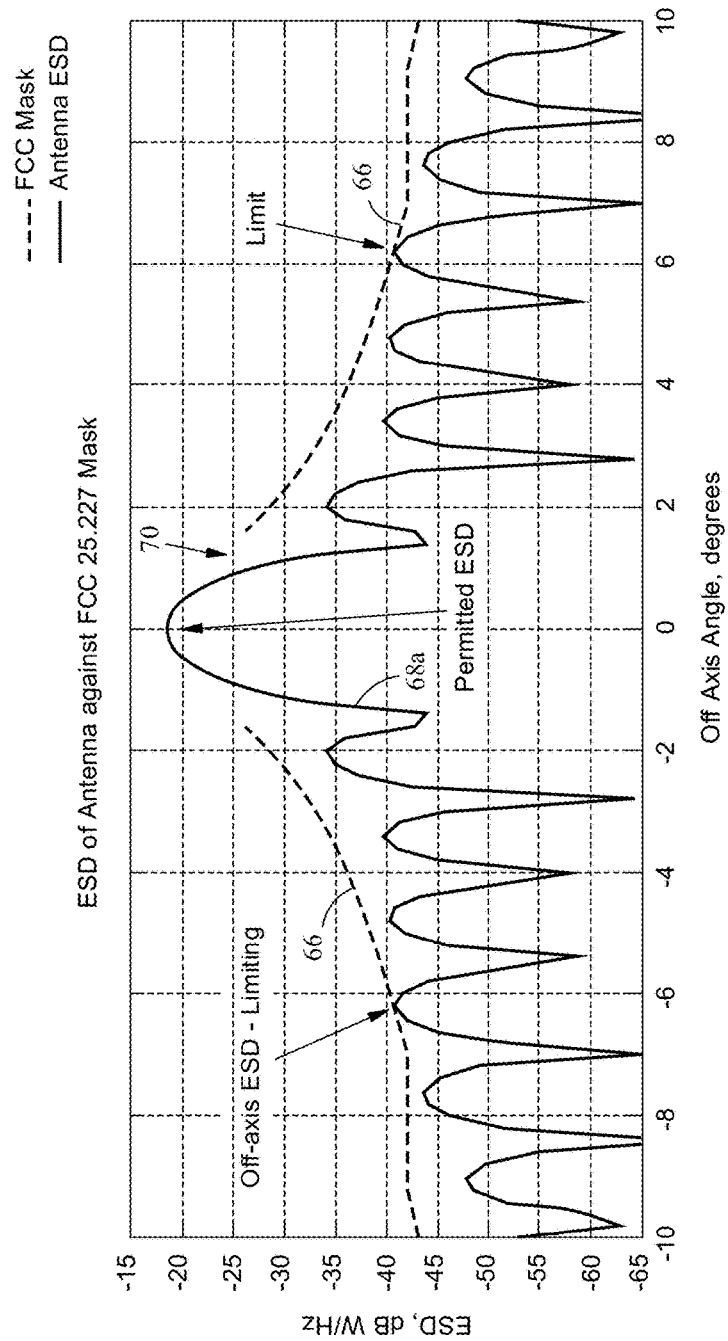
FIGS. 6A and 6B are graphs plotting EIRP spectral density (ESD) values for minimum and maximum skew angles, respectively, for a given elevation angle, each showing a regulatory mask overlaid thereon.
Figure 6B:
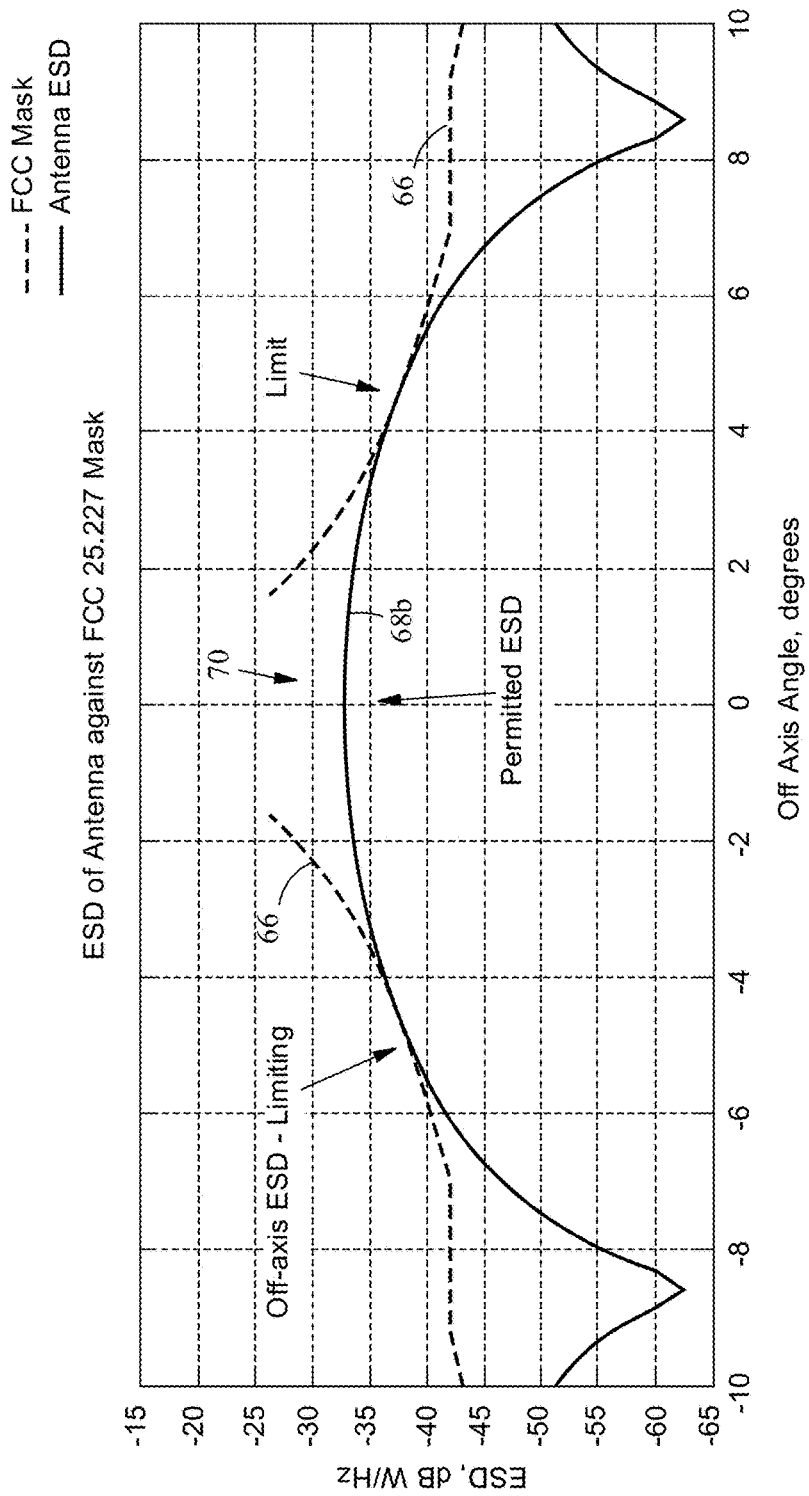

With the antenna transmit gain pattern being converted to the ESD values, a regulatory mask is overlaid as an envelope for ensuring compliance. FIGS. 6A and 6B both include a plot of such regulatory compliance mask 66. In further detail, FIG. 6A also includes a plot 68a of the computed ESD values over a range of axis angles between −10° and 10°, for the minimum skew angle. FIG. 6B, on the other hand, includes a plot 68b of the computed ESD values over the same range of axis angles between −10° and 10°, but for the maximum skew angle. The limits for the regulatory mask may be based upon FCC (U.S. Federal Communications Commission) limits set forth in 47 C.F.R. § 25.227, but this is by way of example only and not of limitation. Limits and restrictions imposed in other jurisdictions outside of the United States may also be used to compute the regulator mask.

For antennas that are not characterized by grating lobes, the on-axis ESD is understood to be the maximum ESD at the transmission axis or 0° off-axis angle. In this regard, the regulatory mask is characterized by a mask opening 70 corresponding to the transmission axis, and off-axis angles within 1.5° or more thereof. By reducing the power and/or increasing the bandwidth, the ESD from the antenna 58 is understood to be reduced so that the limits on the ESD imposed by the regulatory compliance mask 66 are met. Continuing with the examples illustrated in FIG. 6A, the ESD at ±6.2° off-axis angles, e.g., the fourth side lobes, meet the regulatory compliance mask 66. FIG. 6B illustrates the plot 68b of the ESD at ±4.6° off-axis angles, e.g., the main beam, likewise meet the regulatory compliance mask 66. The maximum ESD at the beam peak or the on-axis angle for which either the main beam or side lobes first intersect with the regulatory compliance mask 66 is understood to define the maximum permitted ESD for the particular combination of the skew angle and elevation angle. As can be seen from the illustrated ESD plots of FIGS. 6A and 6B, the on-axis ESD may be significantly different between the minimum skew angle and the maximum skew angle for a given elevation angle.

The graphical representation of using the regulatory compliance mask 66 to arrive at the peak ESD was described, but the same computations may be represented in the following tabular form shown in Table 1. In particular, the first row of values correspond to the example shown in relation to the plot 68a of FIG. 6A, and the second row of values correspond to the example shown in relation to the plot 68b of FIG. 6B. The carrier bandwidth, the EIRP back-off from the peak antenna EIRP, the skew angle, the elevation angle, the off-axis angle where the ESD and the regulatory compliance mask 66 first intersect, and the peak ESD have been derived for each example.

TABLE 1

|  | Carrier Bandwidth (MHz) | EIRP Back-off (dB) | Skew Angle (degrees) | Elevation Angle (degrees) | Off-axis angle limiting ESD (degrees) | Beam Peak ESD (dBW/Hz) |
|---|---|---|---|---|---|---|
| Example 1 | 0.84 | 1.5 | 0 | 0 | 6.2 | −18.58 |
| Example 2 | 16 | 3 | 90 | 0 | 4.6 | −32.8 |

For antennas that have gain patterns that vary with elevation angle and skew angle, there is understood to be a high number of data points that are used to characterize the on-axis ESD limits. According to one embodiment of the present disclosure, these computations are repeated in 1° increments in elevation angle from 0° to 90°, as well as for increments in skew angle from the same 0° to 90° range. In this embodiment, there is understood to be 8100 unique data points.

Due to the complications arising from processing multiple variables that change for each condition, at least one of the variables is normalized to a constant. Carrier bandwidth is one of the variables that can be manipulated to control ESD, and so according to one embodiment, this variable may be one candidate for normalization. More particularly, EIRP back off is re-derived by the following computation:

$$EIRP\text{ Backoff}' = EIRP\text{ Backof} + 10\log_{10}\frac{(Current\ Bandwidth)}{(Constant\ Bandwidth)}$$

Continuing with the example shown in Table 1 above, Table 2 below illustrates the recomputed values as such:

TABLE 2

|  | Carrier Bandwidth (MHz) | EIRP Back-off (dB) | Skew Angle (degrees) | Elevation Angle (degrees) | Off-axis angle limiting ESD (degrees) | Beam Peak ESD (dBW/Hz) |
|---|---|---|---|---|---|---|
| Example 1 | 1.2 | 0 | 0 | 0 | 6.2 | −18.58 |
| Example 2 | 1.2 | 14.24 | 90 | 0 | 4.6 | −32.8 |

This normalization procedure is contemplated to reduce the number of variables that must be manipulated, and can be repeated for unique pairs of elevation angles and skew angles. With the values being normalized to a fixed carrier bandwidth, the on-axis ESD/beam peak ESD can also be normalized to its peak value. With the maximum beam peak ESD being the starting point and assigned a zero value, the remaining beam peak ESD values are computed relative to the normalized beam peak ESD. Continuing with the examples shown in Tables 1 and 2 above, Table 3 below illustrates the values adjusted according to a normalized beam peak ESD.

TABLE 3

|  | Carrier Bandwidth (MHz) | EIRP Back-off (dB) | Skew Angle (degrees) | Elevation Angle (degrees) | Off-axis angle limiting ESD (degrees) | Beam Peak ESD (dBW/Hz) |
|---|---|---|---|---|---|---|
| Example 1 | 1.2 | 0 | 0 | 0 | 6.2 | 0 |
| Example 2 | 1.2 | 14.24 | 90 | 0 | 4.6 | −14.2 |

Both the EIRP back-off and the beam peak ESD are understood to remain the same, except for the sign reversal.

Figure 8A:
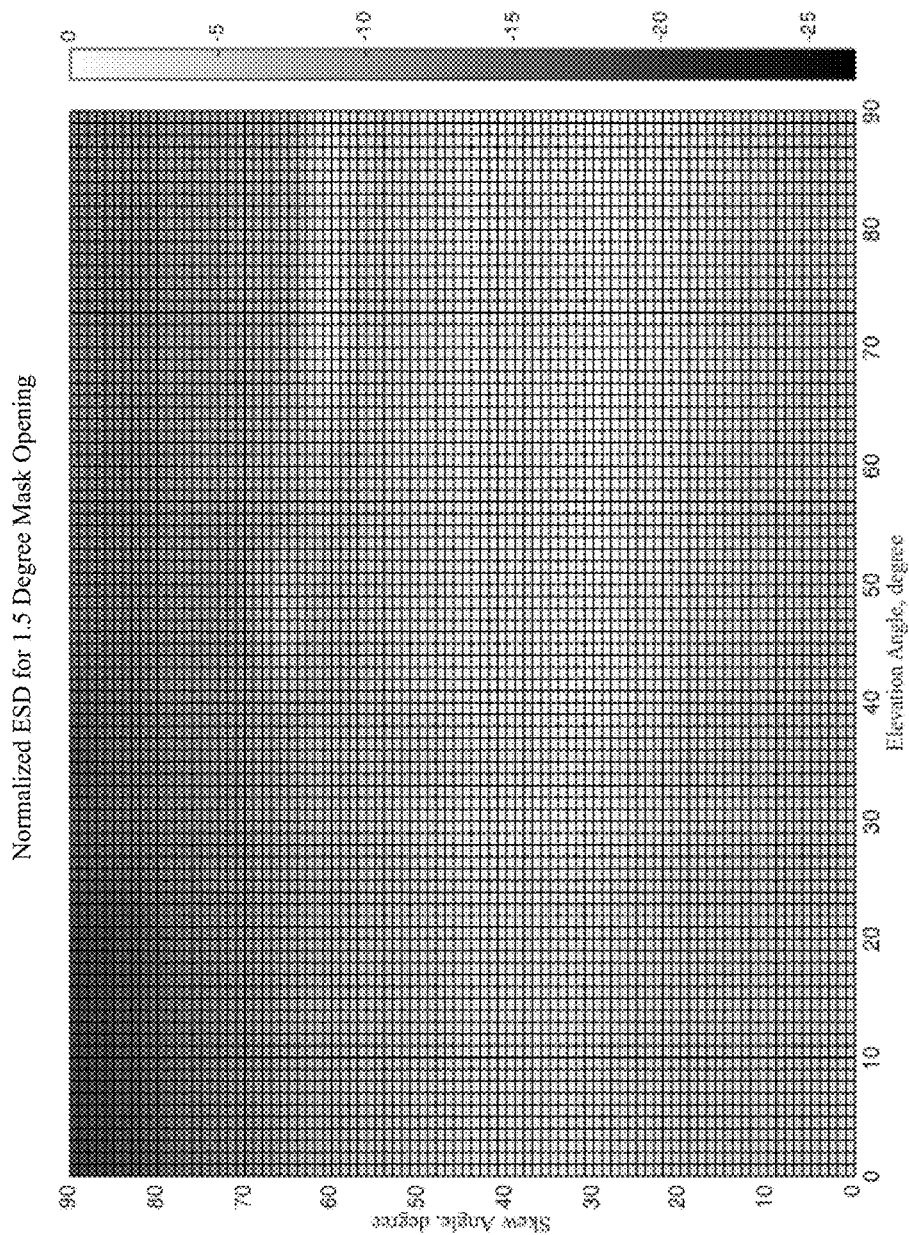
FIGS. 8A and 8B are a graphical representation of the normalized ESD values for possible skew angles and elevation angles for a fixed bandwidth using a 1.5° opening regulatory mask and a 3.5° opening regulatory mask, respectively.
Figure 8B:
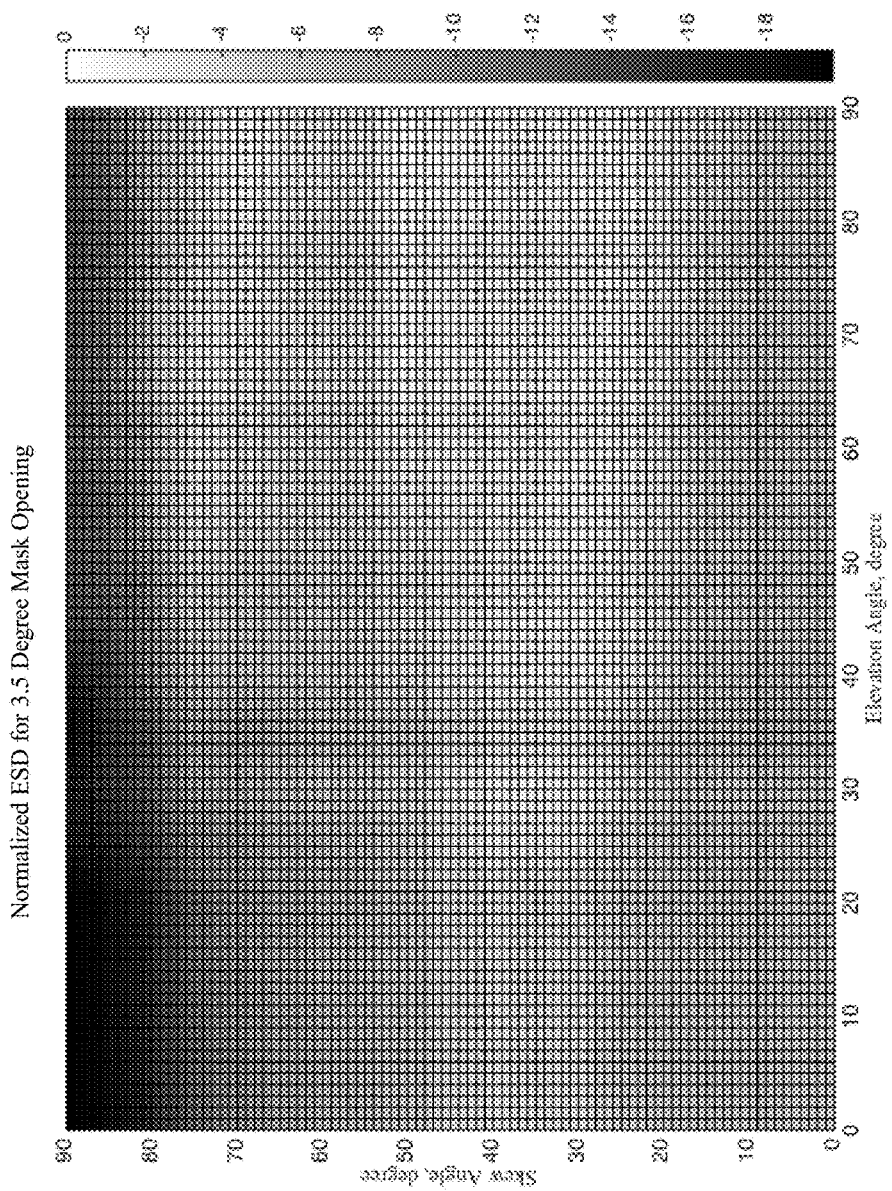

From the computed ESD values for a given antenna, the carrier bandwidth is recomputed to be constant for all normalized ESD values, and may then be referred to as a reference bandwidth. The Beam peak ESD values are then normalized and combined with the EIRP back-off. The off-axis angle values to limit ESD are discarded, since the on-axis or 0° off-axis ESD value is available. A new table is generated with rows corresponding to the range of elevation angles and columns corresponding to skew angles. A normalized ESD value is thus given for each unique combination of elevation angles and skew angles, (of which there are 8,100, as noted above) with the particular table being associated with a fixed or reference bandwidth. An example of such a table is shown in FIG. 7, and a graphical representation of the normalized ESD values for the entire range of skew angles and elevation angles being depicted in FIGS. 8A and 8B. The density is understood to represent the depth of the normalized ESD value.

Briefly referring back to the graph of FIGS. 6A and 6B, the mask opening 70 corresponds to the transmission axis as well as off-axis angles of 1.5°. Those ends of the regulatory compliance mask 66 that define the mask opening 70 are generally understood to be consistent with the angular separation of the communications satellites 40 in the geostationary orbit arc. A greater number of communications satellites 40 are positioned in geostationary orbit near North America, and thus a smaller angular separation is needed. However, a fewer number of satellites are positioned in other regions such as over the Atlantic Ocean or the Pacific Ocean, and so the angular separation between the communications satellites 40 is understood to be larger. Oftentimes, a satellite may negotiate with neighboring satellites to permit certain mask opening angles, which may depart from the standard regulatory requirements.

When the aircraft is within the jurisdiction of the United States Federal Communications Commission, the mask opening is understood to be approximately 1.5°. However, wider mask openings are possible in other areas such as over sparsely populated airspace above the ocean, for which the mask opening may be 3.5°. In such cases, the off-axis angle and the corresponding regulatory compliance mask 66 begins at ±3.5° instead of ±1.5°, and the normalized ESD values for such different mask opening may also be computed. By way of comparison, the graphical representation shown in FIG. 8B, for a 3.5° mask opening, shows a normalized ESD value profile that is different than that of the 1.5° mask opening. In accordance with various embodiments of the present disclosure, multiple sets of normalized ESD value tables can be generated for 1.5°, 2.0°, 2.5°, 3.0°, 3.5°, 4.0°, 4.5°, 5.0°, and 5.5° mask openings, and this range is understood to accommodate most cases globally.

Figure 9:
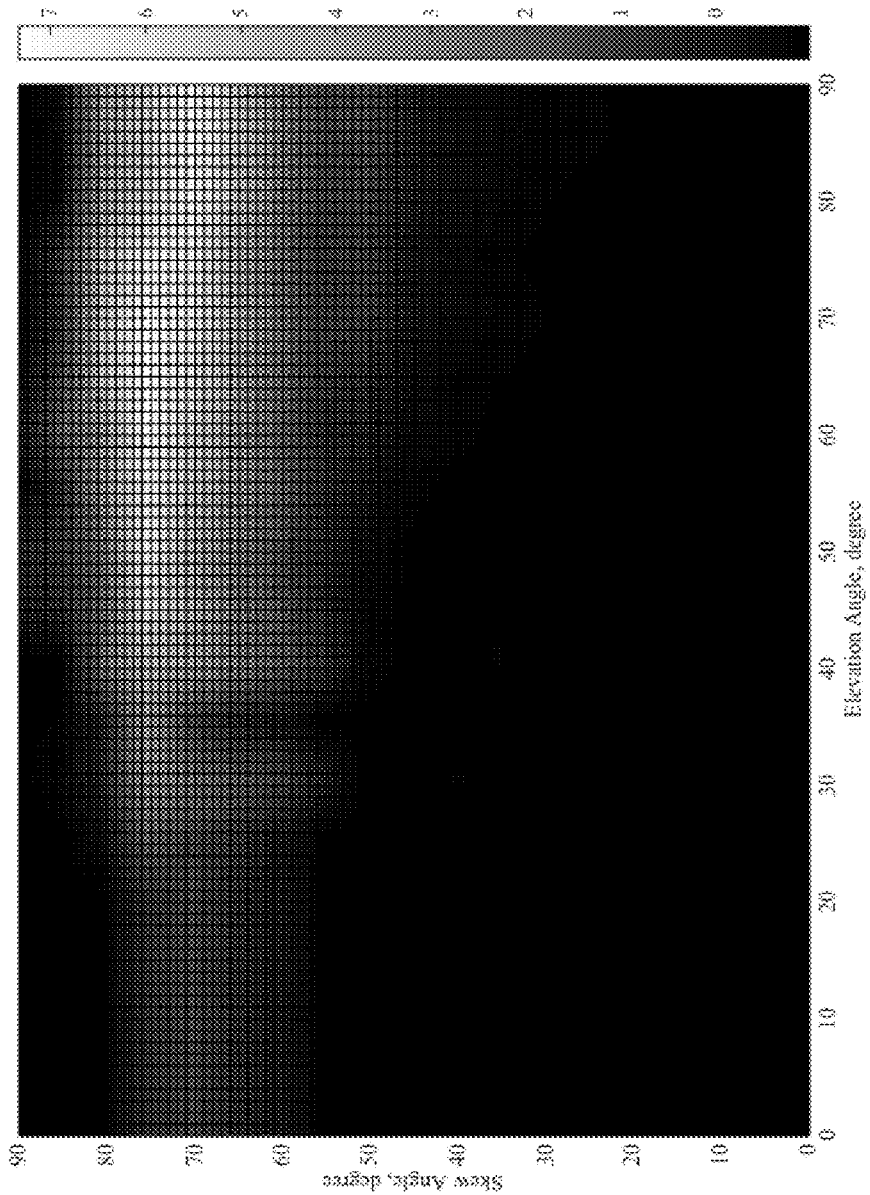
FIG. 9 is a graphical representation of the mask opening offset for possible skew angles and elevation angles for a fixed bandwidth between the 1.5° opening regulatory mask and the 3.5° opening regulatory mask.

Another embodiment contemplates defining the most common mask opening, e.g., that of the U.S. FCC regulatory mask of 1.5°, as a benchmark, and applying an offset relative to that benchmark. In further detail, the mask opening offset is computed thus: Mask Opening Offset ($\varphi$)=Normalized ESD ($\varphi$)−Normalized ESD (1.5), where $\varphi$ is the different mask opening. The normalized ESD values are recomputed based upon this mask opening offset, with the graphical representation of FIG. 9 illustrating the applicable offset between a 3.5° mask opening and a 1.5° mask opening.

With reference again to the block diagram of FIG. 2, various embodiments of the present disclosure envision the dynamic control of ESD by controlling satellite uplink parameters in real-time. In this regard, one embodiment contemplates a method for controlling the ESD of the communications link between the aircraft 10 and the communications satellite 40, e.g., the uplink 38. The steps of this method are shown in the flowchart of FIG. 10, which begins with a system startup step 100.

As indicated above, control of the ESD is based at least in part on the performance characteristics of the antenna 58 that are defined in the aforementioned tables of normalized ESD values arranged according to skew angle and elevation angle. Additionally, however, and referring back to the block diagram of FIG. 2, control of the ESD is also based in part on the operation of the aircraft, which includes the location of the aircraft 10 and the orientation of the antenna 58 relative to the communications satellite 40. This information may be retrieved from an inertial navigation system 72 of the aircraft 10, which provides, in real-time, the aircraft latitude, longitude, roll, pitch, and heading. The step 102 of obtaining aircraft location identification corresponds to his retrieval step. The inertial navigation system 72 may be connected to an ARINC (Aeronautical Radio, Incorporated) data bus 78, from which the broadband controller 54 receives this data. The antenna controller unit 52 of the satellite terminal 36 may also be connected to the aircraft inertial navigation system 72 via the ARINC data bus 78 to receive and further process this aircraft navigation data.

Figure 10:
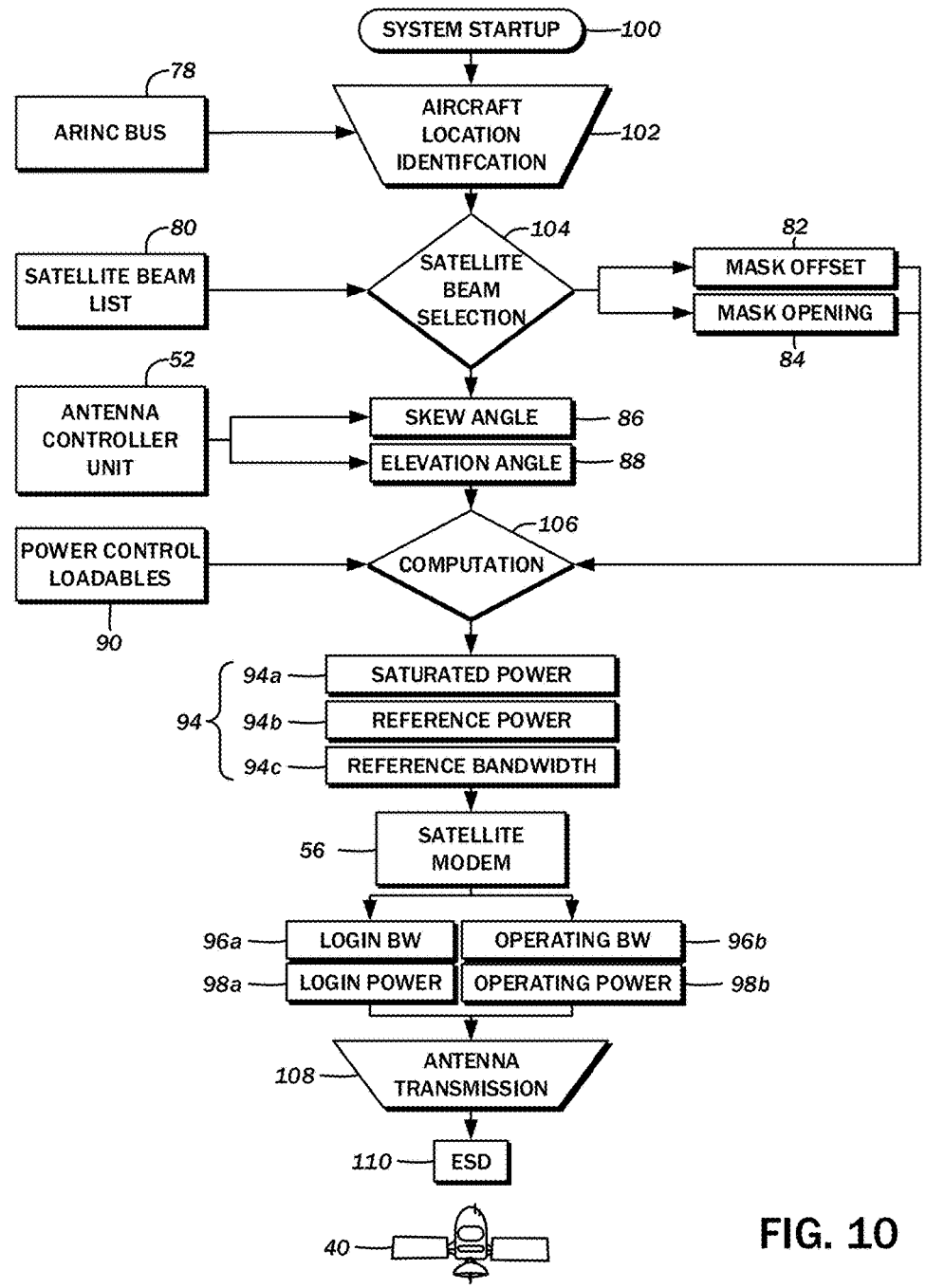
FIG. 10 is a flowchart of a method for controlling ESD in accordance with another embodiment of the present disclosure.

Continuing with the discussion of the steps of the method for controlling ESD shown in FIG. 10, there is a satellite beam selection step 104. Various embodiments contemplate a satellite beam list 80 from which this selection is made, and a specific mask offset value 82 and a mask opening offset value 84 associated with the selected satellite beam is retrieved. These values are processed in a subsequent step, and will be described in further detail below. Additional antenna parameters utilized in the subsequent steps to dynamically control ESD from the antenna 58, including a skew angle value 86 and an elevation angle value 88 relative to the communications satellite 40 may be computed from the navigation data by the antenna controller unit 52.

In general terms, the broadband controller 54 computes a set of output variables to the satellite modem 56 that controls its operation, including the output power and the bandwidth in a computation step 106. This computation contemplated to be a function of the normalized ESD values of the antenna 58 that are derived from the transmit gain pattern as discussed above, as well as the antenna orientation data, e.g., the skew angle value 86 and the elevation angle value 88. Additionally, the computation may include the regulatory compliance mask 66, specifically as defined by the mask offset value 82 and the mask opening offset value 84.

As discussed above, the normalized ESD values are pre-computed and provided as a loadable data file 90. According to one embodiment, the loadable data file 90 may be in a comma-separated-value (CSV) file format, with different files corresponding to various antenna types that varies gain for elevation and/or skew angle. It is understood that one file per antenna type is need to store the normalized ESD values in a tabular format. This tabular data file is accompanied by a reference bandwidth that is used to normalize the other variable values.

As part of performing the computation step 106, the output power value from the broadband controller 54 is mapped to the maximum EIRP of the antenna 58. The relationship between the output power value and the maximum EIRP is understood to vary from aircraft to aircraft, depending on certain installation specifics. Generally, however, maximum equivalent isotropic radiated power is given by: A−System Loss+System Gain, where A corresponds to the broadband controller output power value that is mapped to the maximum EIRP of the antenna 58.

The maximum EIRP of a particular antenna is understood to be the same regardless of installation, but the output power values from the broadband controller 54 to produce the same output EIRP may vary based on system losses and gains. As will be recognized by those having ordinary skill in the art, some antennas perform gain compensation that automatically adjusts the gain and losses to produce the same EIRP for a given broadband controller output power.

Additional adjustments to the mapping A between the broadband controller output power value and the maximum EIRP of the antenna 58 are also contemplated for other factors. These include different gain response to frequency, degradation of antenna gains over time, and so forth. Including a saturated power offset, x, is contemplated to account for any adjustments needed for each terminal and uplink beam, where $A_x$=A (antenna, beam)+x (antenna, beam).

The normalized ESD values are then mapped to a function of the skew angle value 86 and the elevation angle value 88 for a given reference bandwidth. It is possible to introduce an offset to the normalized ESD values with a new variable $A_n$, thus: B=A (antenna, beam)+x (antenna, beam)+Normalized ESD (skew, elevation)

Figure 11:
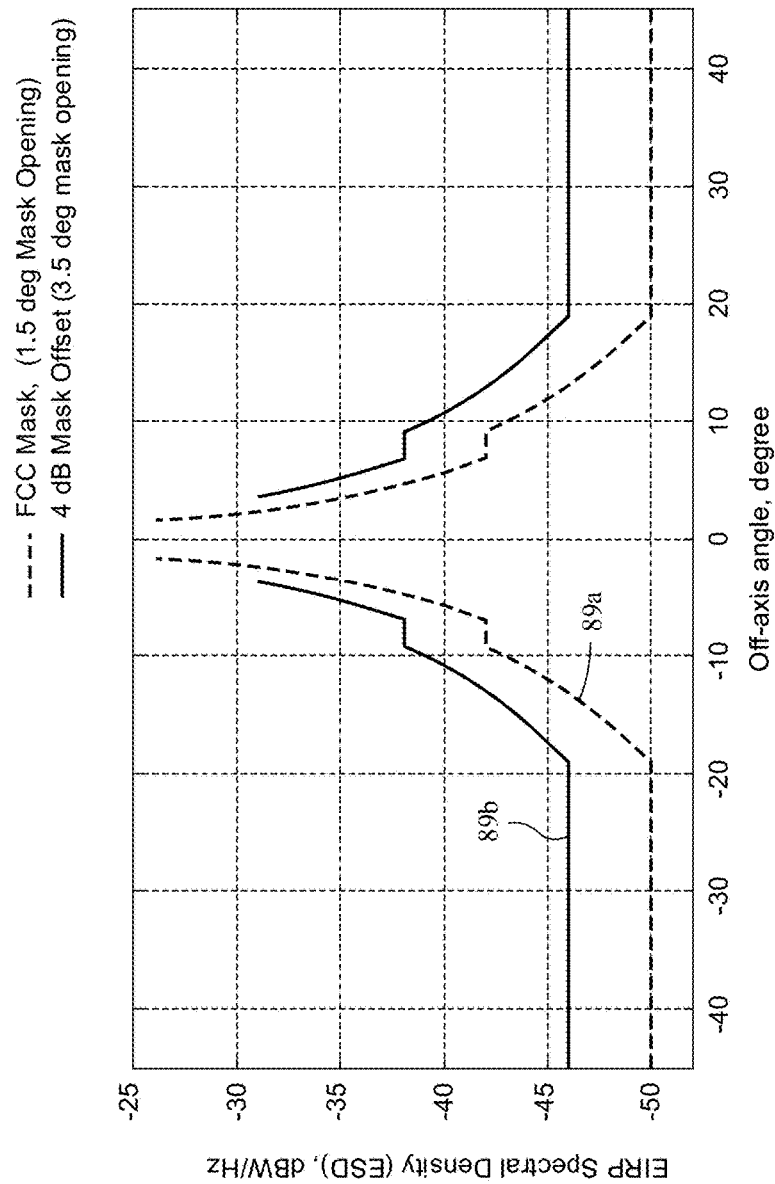
FIG. 11 is a graph with plots corresponding to a regulatory mask and a regulatory mask with an offset.

Turning back to the mask offset value 82 and the mask opening offset value 84, because aeronautical broadband satellite communications (ASBC) is envisioned for global service, different regulatory compliance masks 66 may apply while the aircraft 10 is in different regions, or communicating with specific satellites 40. As mentioned above, some satellites may also require a different mask than the broadly applicable and benchmark FCC mask. Referring to the graph of FIG. 11, the mask offset value 82 is that which is associated with a satellite beam, and applies proportionally to all off-axis angles. The original, FCC-benchmark mask is shown as a plot 89a, and the mask with the offset is shown as a plot 89b. This value typically does not change during the lifespan of the satellite beam, and with the satellite beam list 80 already being loaded onto the broadband controller 54, it may be introduced into a map of the beam properties. In more general terms, mask offset C may be defined as MaskOffset (beam)+A (antenna, beam)+x (antenna, beam)+Normalized ESD (skew, elevation), with variable A being the saturated power and variable x being the saturated power offset as defined above.

The mask opening offset value 84 is mapped to the elevation angle and the skew angle for a given reference bandwidth, similar to the normalized ESD values. Again, one embodiment contemplates nine (9) possible mask opening offset values along with the corresponding loadable data files 90 of the tabulated normalized ESD values for the range of mask openings including 1.5°, 2.0°, 2.5°, 3.0°, 3.5°, 4.0°, 4.5°, 5.0°, and 5.5°. The selection is based upon the satellite beam with coverage in a locale that the aircraft 10 is flying, and is understood to be associated with a particular mask opening value. By way of example, a selected satellite beam over Europe may allow a mask opening of 2.5° and the mask opening offset value 84 is set as such, the selected CSV/loadable data file 90 is likewise includes normalized ESD values computed with the mask opening of 2.5°. In more general terms, mask opening offset D may be defined as MaskOpeningOffset (skew, elevation, beam)+MaskOffset (beam)+A (antenna, beam)+x (antenna, beam)+Normalized ESD (skew, elevation), with variable A being the saturated power, variable x being the saturated power offset, and MaskOffset being the mask offset value 82, all as set forth above.

The foregoing computational procedure is based upon a constant reference bandwidth in order to reduce and simplify the variables. The present disclosure further envisions an additional step to review and revise this reference bandwidth, and two conditions are evaluated to determine whether a re-computation is necessary. One of the conditions is where variable D is greater than variable A. This is more likely than not to be the case, but Ax is understood to be the maximum which can deliver the maximum EIRP for a particular antenna. Accordingly, the reference bandwidth $R_{ss}$ is:

$$R_s 10^{\left(\frac{A+x-D}{10}\right)}.$$

The other condition is where variable D is less than variable $A_x$, in which case, no change in the reference bandwidth is necessary.

Figure 12:
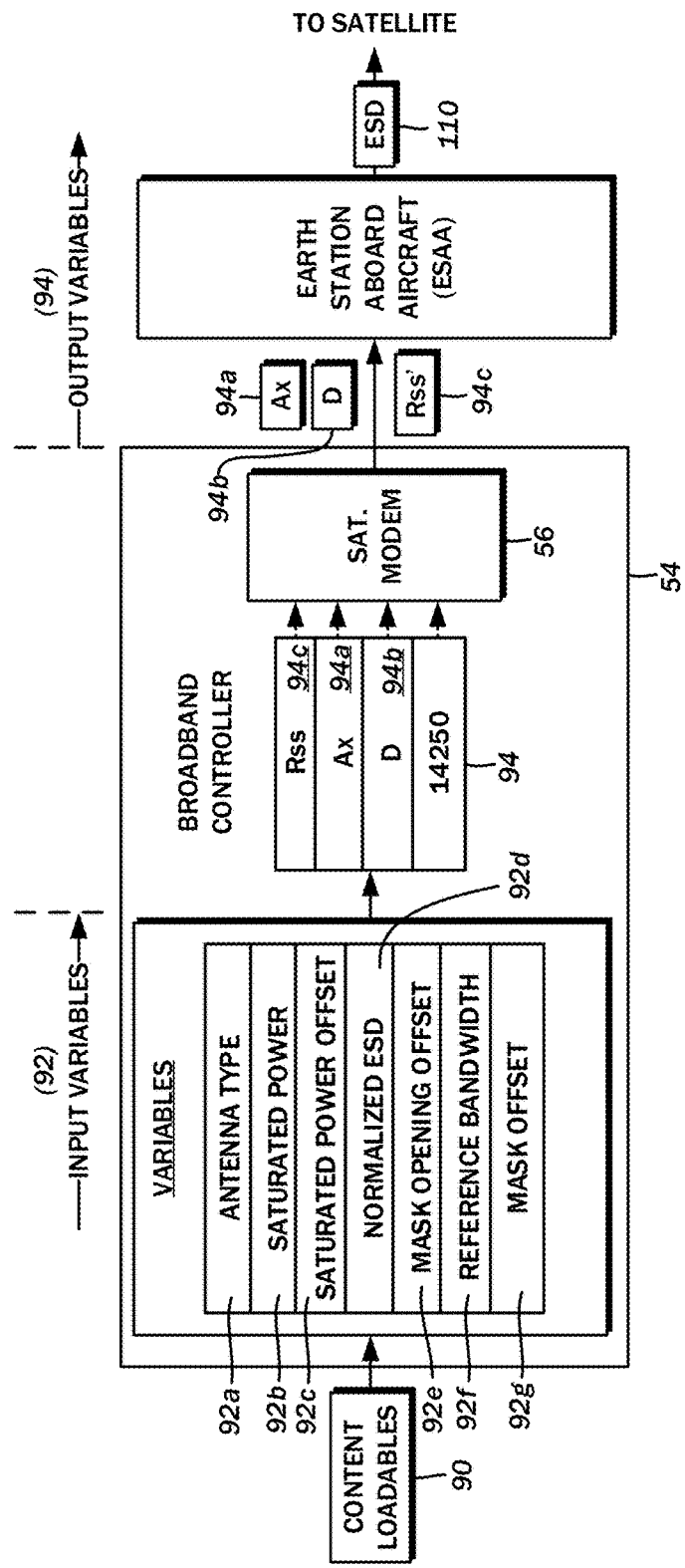
FIG. 12 is a block diagram showing input variables to a broadband controller and the output variables provided by the same according to one embodiment of the present disclosure.

The block diagram of FIG. 12 best illustrates the various input variables 92 to broadband controller 54 and the computation step 106 including the aforementioned antenna type 92a, the saturated power 92b, the saturated power offset 92c, the normalized ESD values 92d, the mask opening offset 92e, the reference bandwidth 92f, and the mask offset 92g. The normalized ESD values 92d originate from the loadable data files 90 as also discussed above. As a result of the computation step 106, a set of output variables 94 that are used to control the output power and carrier bandwidth of transmissions from the antenna 58 may be generated. Furthermore, these output values are understood to result in ESD within predefined limits, and vary in response to or based upon the antenna orientation data. More particularly, the output variables 94 relayed to the satellite modem 56 may include saturated power $(A_x)$ 94a, reference power (D) 94b, reference bandwidth $(R_{ss})$ 94c, and a frequency value, which may be a constant 14250 MHz.

The satellite modem 56 may further manipulate these operational parameters to match a data rate demand, but is configured to honor, and operate within the limits as defined by the output variables 94, particularly as to impacts on EIRP spectral density at any given time. Although the block diagram of FIG. 12 illustrates the satellite modem 56 being a component within the broadband controller 54, this is by way of example only and not of limitation. In one implementation, the satellite modem 56 is understood to be a separate external component from a separate manufacturer, e.g., Newtec Cy N.V. of Sint-Niklaas, Belgium.

The method for controlling ESD as described above may be implemented as a series of software-based instructions that are executed by the broadband controller 54. In this regard, the broadband controller 54 may include a general-purpose data processor, memory, and the like, as well as data networking modalities, all of which would be within the purview of one having ordinary skill in the art. The software instructions may be stored on a non-transitory computer-readable medium that is connectible to the broadband controller 54.

Continuing with the method depicted in the flowchart of FIG. 10, there may be two operational states with respect to the satellite modem 56, each differing in the way the output power and the carrier bandwidth are handled: a login state and an operational state. The login state corresponds to the initial activation of the satellite communications service, but is not yet operational. The transmit power 98 is, for the most part, governed by the output variables 94 from the broadband controller 54. There is a fixed dedicated bandwidth 96a that is allocated for a terminal to first join the network, the satellite modem 56 computes a login power 98a based on the following computation:

$$\text{Login Power} = \min\left(\text{Saturated Power}, \text{Reference Power} + 10 \log_{10} \frac{\text{Login Bandwidth}}{\text{Reference Bandwidth}}\right).$$

Once the terminal successfully joins the satellite network for the first time, a demodulator and the network hub can derive the achieved carrier-to-noise ratio (C/N), the transmit power, and the transmit bandwidth. The bandwidth manager of the network hub can then estimate the power and bandwidth required to deliver the data rate that is demanded by the terminal.

The data rate allocations follows a set of three possible rules. First, the demanded data rate may be met by allocating a minimum bandwidth and maximum allowed output power as provided by the broadband controller 54. This rule may be summarized as: Operating power–10 $\log_{10}$(Operating Bandwidth)≤Reference Power–10 $\log_{10}$(Rereference Bandwidth). Second, the output power is increased up to saturated power and bandwidth proportionally until the demanded data rate is met. Third, if all available power up to saturated power is used, increase only the bandwidth while maintaining the same output power/saturated power until the demanded data rate is met. The computed operating power 96b by the satellite modem 56 is based on the following:

$$\text{Operating Power} = \min\left(\text{Saturated Power}, \text{Reference Power} + 10 \log_{10} \frac{\text{Operating Bandwidth}}{\text{Reference Bandwidth}}\right).$$

The signal for the uplink 38 is amplified to the power levels as defined above, and transmitted to the communications satellite 40 via the antenna 58 in an antenna transmission step 108, with such signal having an equivalent isotropic radiated power spectral density that meets all regulatory constraints. In accordance with various embodiments of the present disclosure, the output power levels are adjusted in real-time as the orientation of the antenna 58 relative to the communications satellite 40 changes in accordance with flight maneuvers.

The particulars shown herein are by way of example only for purposes of illustrative discussion, and are presented in the cause of providing what is believed to be the most useful and readily understood description of the principles and conceptual aspects of the various embodiments of the dynamic EIRP spectral density control system and methods. In this regard, no attempt is made to show any more detail than is necessary for a fundamental understanding of the different features of the various embodiments, the description taken with the drawings making apparent to those skilled in the art how these may be implemented in practice.

What is claimed is:

1. An aeronautical satellite broadband communications system, comprising:
   an antenna defined by a transmit gain pattern varying according to an orientation relative to a geostationary orbit satellite;
   an antenna controller unit connected to an aircraft inertial navigation system and receptive to navigation data therefrom, a set of antenna orientation data being derived from the navigation data on a real-time basis;
   a broadband controller connected to the antenna controller unit, and generating a set of output variables as a function of normalized equivalent isotropic radiated power spectral density values of the antenna derived from the transmit gain pattern and the set of antenna orientation data, the set of output variables controlling output power and carrier bandwidth of transmissions from the antenna within predefined limits of equivalent isotropic radiated power spectral density varying with values of the set of antenna orientation data; and
   a satellite modem connected to the antenna and to the broadband controller, the output power and carrier bandwidth of the satellite modem to the antenna being set based upon the output variables from the broadband controller.

2. The system of claim 1, wherein the predefined limits of the output power and the carrier bandwidth is based upon a regulatory compliance mask applied to the normalized equivalent isotropic radiated power spectral density values.

3. The system of claim 2, wherein the regulatory compliance mask includes a mask opening defined by off-axis angle limits of the orientation of the antenna to the geostationary orbit satellite.

4. The system of claim 2, wherein the regulatory compliance mask is offset proportionally to all off-axis angles of the orientation of the antenna to the geostationary orbit satellite.

5. The system of claim 1, wherein the navigation data is selected from a group consisting of: aircraft location, aircraft roll angle, aircraft pitch angle, and aircraft heading.

6. The system of claim 1, wherein the orientation of the antenna relative to the geostationary orbit satellite is selected from a group consisting of: skew angle, elevation angle, and azimuthal angle.

7. The system of claim 1, wherein the output variables is selected from a group consisting of: saturated power, reference power, and reference bandwidth.

8. The system of claim 1, wherein the satellite modem operates in a login state with transmissions generated during the login state having a predefined fixed bandwidth and the output power corresponding to the set of output variables from the broadband controller.

9. The system of claim 1, wherein the satellite modem operates in an operational state with the transmissions generated during the operational state having a variable bandwidth and variable output power dependent upon data rate demands.

10. The system of claim 1, wherein the antenna is selected from a group consisting of: an electronically steered low profile antenna, a mechanically steered high profile antenna, and a parabolic antenna.

11. A method for controlling equivalent isotropic radiated power spectral density of a communications link between an aircraft and a geosynchronous orbit satellite, the method comprising:
retrieving navigation data from an avionics bus of the aircraft;
selecting a satellite beam from a plurality of available satellite beams for establishing the communications link to the geosynchronous orbit satellite, each of the satellite beams being associated with a regulatory compliance mask;
retrieving antenna orientation data from an antenna controller unit, the antenna orientation data being derived from the navigation data and is representative of an orientation of the antenna relative to the geosynchronous orbit satellite;
generating, on a broadband controller, a set of output variables as a function of the antenna orientation data, a set of normalized equivalent isotropic radiated power spectral density values for an antenna mounted to the aircraft, and the regulatory compliance mask; and
relaying the output variables to a modem, an output power and a carrier bandwidth of the satellite beam transmitted from the antenna being controllable by the output variables for transmissions to be within predefined limits of equivalent isotropic radiated power spectral density.

12. The method of claim 11, wherein the normalized equivalent isotropic radiated power spectral density values of the antenna are precomputed from a transmit gain pattern thereof.

13. The method of claim 11, wherein the regulatory compliance mask includes a mask opening defined by off-axis angle limits of the orientation of the antenna to the geostationary orbit satellite.

14. The method of claim 11, wherein the regulatory compliance mask is offset proportionally to all off-axis angles of the orientation of the antenna to the geostationary orbit satellite.

15. The method of claim 11, wherein the predefined limits of equivalent isotropic radiated power spectral density varies in real-time according to changing orientation of the antenna relative to the geosynchronous orbit satellite during flight maneuvers of the aircraft.

16. The method of claim 11, wherein the regulatory compliance mask is specific to a geographic region in which the aircraft is flying.

17. The method of claim 11, wherein the navigation data is selected from a group consisting of: aircraft location, aircraft roll angle, aircraft pitch angle, and aircraft heading.

18. The method of claim 11, wherein the orientation of the antenna relative to the geostationary orbit satellite is selected from a group consisting of: skew angle, elevation angle, and azimuthal angle.

19. The method of claim 11, wherein the output variables is selected from a group consisting of: saturated power, reference power, and reference bandwidth.

20. A non-transitory computer readable medium connectible to an aeronautical satellite broadband communications system including instructions executable by the system for performing a method of controlling equivalent isotropic radiated power spectral density of a communications link between the system and a geosynchronous orbit satellite, the method comprising:
retrieving navigation data from an avionics bus of the aircraft;
selecting a satellite beam from a plurality of available satellite beams for establishing the communications link to the geosynchronous orbit satellite, each of the satellite beams being associated with a regulatory compliance mask;
retrieving antenna orientation data from an antenna controller unit, the antenna orientation data being derived from the navigation data and is representative of an orientation of the antenna relative to the geosynchronous orbit satellite;
generating, on a broadband controller, a set of output variables as a function of the antenna orientation data, a set of normalized equivalent isotropic radiated power spectral density values for an antenna mounted to the aircraft, and the regulatory compliance mask; and
relaying the output variables to a modem, an output power and a carrier bandwidth of the satellite beam transmitted from the antenna being controllable by the output variables for transmissions to be within predefined limits of equivalent isotropic radiated power spectral density.

* * * * *